United States Patent
Lo

(10) Patent No.: US 6,744,834 B1
(45) Date of Patent: Jun. 1, 2004

(54) METHOD AND APPARATUS FOR INITIALIZING A SYNCHRONIZER FOR SAME FREQUENCY, PHASE UNKNOWN DATA ACROSS MULTIPLE BIT-SLICED INTERFACES

(75) Inventor: Karen Lo, Saratoga, CA (US)

(73) Assignee: Hewlett-Packard Company, Houston, TX (US)

( * ) Notice: Subject to any disclaimer, the term of this patent is extended or adjusted under 35 U.S.C. 154(b) by 0 days.

(21) Appl. No.: 09/561,142

(22) Filed: Apr. 28, 2000

(51) Int. Cl.$^7$ ................................................. H04L 7/00
(52) U.S. Cl. ................................................. 375/354
(58) Field of Search ........................... 375/354, 362, 375/365, 368, 371, 372

(56) References Cited

U.S. PATENT DOCUMENTS 4,622,666 A * 11/1986 Graves et al. ............... 370/512
6,005,901 A    12/1999 Linz
6,563,875 B2 *  5/2003 Auvray et al. ......... 375/240.13

FOREIGN PATENT DOCUMENTS

JP    407321836 A  * 12/1995  .......... H04L/12/42
WO    WO99/62226     12/1999

* cited by examiner

Primary Examiner—Don N. Vo

(57) ABSTRACT

A method and apparatus for initializing a synchronizer is provided. The initialization circuitry includes a pattern generator for generating an initialization pattern, a pattern detector for recognizing the initialization pattern, and a read select circuit. After recognition of an initialization pattern, the write pointer is set to a predetermined location in the data buffer of the synchronizer to be read. A predetermined number of cycles after receipt of a unique clock cycle identifier signal (the global frame clock) by the read select circuit, valid data in lockstep with other bitsliced interfaces can be read from the synchronizer.

20 Claims, 7 Drawing Sheets

METHOD AND APPARATUS FOR INITIALIZING A SYNCHRONIZER FOR SAME FREQUENCY, PHASE UNKNOWN DATA ACROSS MULTIPLE BIT-SLICED INTERFACES

REFERENCE TO RELATED APPLICATIONS

Reference is made to the following co-pending and commonly assigned U.S. patent applications entitled: "Simple, High Performance, Bitsliced Mesochronous Synchronizer for a Source Synchronous Link", having Ser. No. 09/561, 143, filed on Apr. 28, 2000, "Halting Datastrobes on a Source-Synchronous Link To Debug Data Capture Problems", having Ser. No. 09/560,364, filed on Apr. 28, 2000, "Method of Creating Clock and Data Equally At The Transmitter Side of A Source Synchronous Loop", having Ser. No. 09/560,214, filed on Apr. 28, 2000.

BACKGROUND OF THE INVENTION

Initializing a synchronizer that is used to synchronize data between clock domains running at the same frequency but with an unknown phase relationship poses several challenges. For example, a low latency synchronizer writes into a data latch in the transmitting clock domain yet reads data from the synchronizer in the receiving clock domain. Such a synchronizer has a relationship between its write pointer and its read pointer that can be maintained indefinitely once that relationship has been established. The problem is determining the relationship between the read and write pointer and initializing the synchronizer with the proper values.

Initialization becomes more complicated in a system with multiple bitsliced interfaces. For systems having multiple bitsliced interfaces, data received into different synchronizers on different chips must be read into the receiving chip(s)'s core clock domain(s) in lockstep with one another. The problem with receiving data in lockstep is that typically the multiple bitsliced interfaces have no communication with one another. This creates a problem since the particular edge of the receiving chip(s)'s clocks which clocks in the data must be one where the data will always be stable and valid. Thus, the synchronizer initialization process needs to account for the largest possible arrival range for the data that needs to be in lockstep without sacrificing too much latency.

There are two problems in particular that make synchronizer initialization difficult: (1) uncertain data arrival time and (2) uncertain data arrival location. Regarding uncertain data arrival time, for data on a particular trace, from any manufactured board or chip to another there may be large variations in the data arrival time at the synchronizer due to large clock skew numbers and process, voltage, temperature (PVT) variations, or bitsliced data may travel across different trace lengths from different chips. As a result, it might be unknown when all the data that needs to be in lockstep together will arrive relative to one another. In addition, the time required for the data to go from the sending chip to the receiving chip (1 cycle, 2 cycles, etc.) might also be unknown.

Regarding uncertain data arrival location, at reset clocks become valid at different times. Thus, the same data symbol from the transmitting chip may go into different data latches in each bitsliced interface. So not only is there no known, fixed time between when the data arrives at the receiving chip and the correct edge at which to latch it, but there is also no known fixed latch from which to latch it.

An initialization process and apparatus that addresses the described challenges, that synchronizes data in multiple bitsliced interfaces in lockstep with one another safely and with low latency, is needed.

SUMMARY OF THE INVENTION

An initialization process and apparatus that initializes a synchronizer that synchronizes data to multiple bitsliced interfaces in lockstep with one another safely and with low latency is provided. The initialization circuitry is used to initialize a synchronizer that synchronizes data between sending chip(s) to receiving chip(s). In the preferred embodiment, the initialization circuitry includes a pattern generator for generating an initialization pattern, a pattern detector for recognizing the initialization pattern, a write control circuit and a read select circuit. The initialization pattern is generated on the sending chip and is detected by the pattern detector circuit located on the receiving chip. The pattern detector is electrically coupled to the output of the pattern generator (latched in the data buffer of the synchronizer) so that it can detect the pattern sent across the link. The read select circuit is electrically coupled to the data buffer of the synchronizer. A predetermined number of cycles after receipt of a unique clock cycle identifier signal (the global frame clock) by the read select circuit, valid data in lockstep with other bitsliced interfaces can be read from a data buffer of the synchronizer.

The method for initializing the synchronizer includes the steps of: sending an initialization pattern to the pattern detect logic circuit; detecting the initialization pattern; responsive to detection of the initialization pattern, setting the write pointer to point to a predetermined location in the data buffer circuit (where the predetermined location is the first latch of the data buffer circuit); and responsive to detection of a unique clock cycle identifier signal, reading the data from the data buffer a predetermined number of cycles after recognition of the unique clock cycle identifier signal.

Part of the synchronizer initialization process (detecting a unique clock cycle identifier, and reading data in the first data latch a predetermined number of cycles after detection of the unique clock cycle identifier signal) is directed towards the critical timing of reading data from the sending chip. Data from the sending chip is buffered in the data buffer circuitry of the synchronizer of the receiving chip. Timing is critical since for multiple bitsliced interfaces, data from all of the interfaces must be read in lockstep. The combination of a unique clock cycle identifier (the global frame clock), and a predetermined delay (determined by the SYNC_CONFIG bits) helps define the critical timing relationship of the synchronizer. Once the timing is established upon synchronizer initialization, valid data can continue to be read by the receiving chip at the proper time.

In the preferred embodiment, the global frame clock (GFC) is used by the receiving chip as a unique clock cycle identifier to synchronize data across interfaces so that data can be read in lockstep. The GFC as a synchronizing signal is easy to create and route with low skew to the chip clocks, since it is preferably a low frequency clock signal that has the same skew as the core clock. The GFC marks a unique chip core clock cycle on each chip, thus allowing the synchronizer control logic to pull data from the different receiving chips in the system on the same clock edge.

The GFC is distributed to all of the receiving chips on the link so that none of the chips need to communicate directly. This allows synchronization of bitsliced data to be much faster than if communication between the chips had to take place. Because the GFC signal can be easily routed to multiple chips, the synchronizer design and initialization process and apparatus can easily be used with any number of bitsliced interfaces. Further, the GFC provides the additional advantage of saving chip real estate and/or pins. Because the GFC is known to be a synchronous signal, the bitsliced chips do not need additional logic to communicate with one another.

A predetermined number of cycles after recognition of the unique clock cycle identifier signal, the GFC, data is read from the first data latch in the synchronizer data buffer (a FIFO). The predetermined delay is related to the synchronizer configuration (SYNC_CONFIG) bits. The synchronizer configuration bits, in the preferred embodiment two bits, are determined prior to synchronizer initialization and are dependent on the worst case latency of the synchronizer.

Because the circuit configuration, length of wires, resistance of wires, number of circuit elements, and impedances associated with circuit elements is known, the worst case latency can be calculated. The worst case latency is assumed in order to ensure that valid data is read. The SYNC_CONFIG bits also allow adjustments to be made during lab link debug and characterization. After validation and testing in the lab, the final value for volume shipments can be set.

Having a configuration value, SYNC_CONFIG, is advantageous in several ways. It allows reading from the synchronizer FIFO at a time when the data is known through analysis to always be stable and valid for registering into the core clock domain. It is programmable, allowing testing and then reconfiguration later to a different latency value when testing shows latencies to be different than expected. It also allows different links to have different latencies so that not all links have to be programmed to the same worst-case value.

Using the RWP initialization pattern, GFC and the SYNC_CONFIG values enable more freedom in board routing because data in different bitslices can be routed with widely varying trace lengths and still be synchronized in lockstep at the receiving chip(s).

A further understanding of the nature and advantages of the invention described herein may be realized by reference to the remaining portion of the specification and the attached drawings.

DETAILED DESCRIPTION OF THE PREFERRED EMBODIMENTS

Figure 1A:
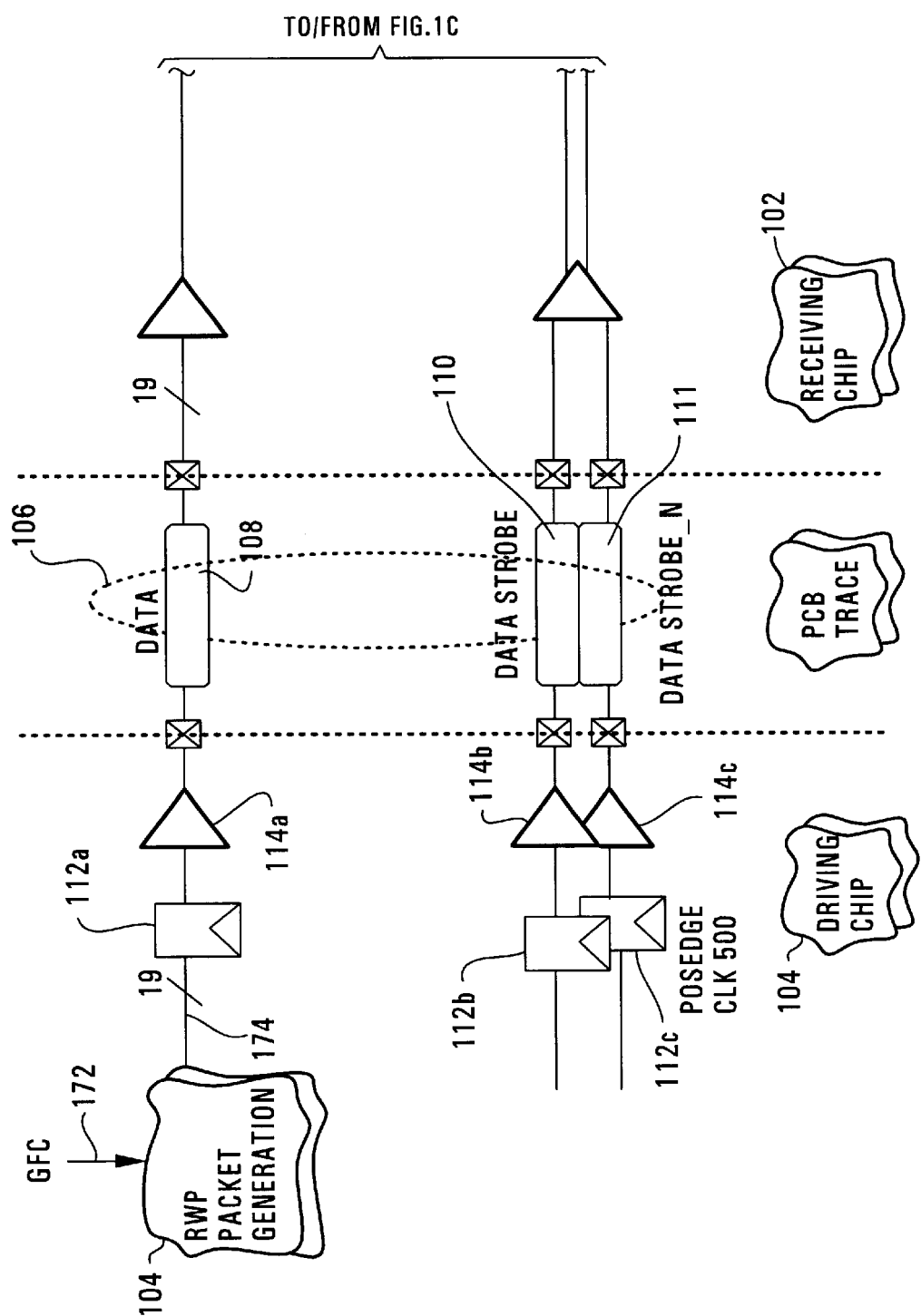
FIG. 1 shows a partial block diagram of a synchronizer and the synchronizer initialization circuitry of the present invention for initializing a synchronizer for the same frequency across multiple bit-sliced interfaces when the phase is unknown.
Figure 1B:
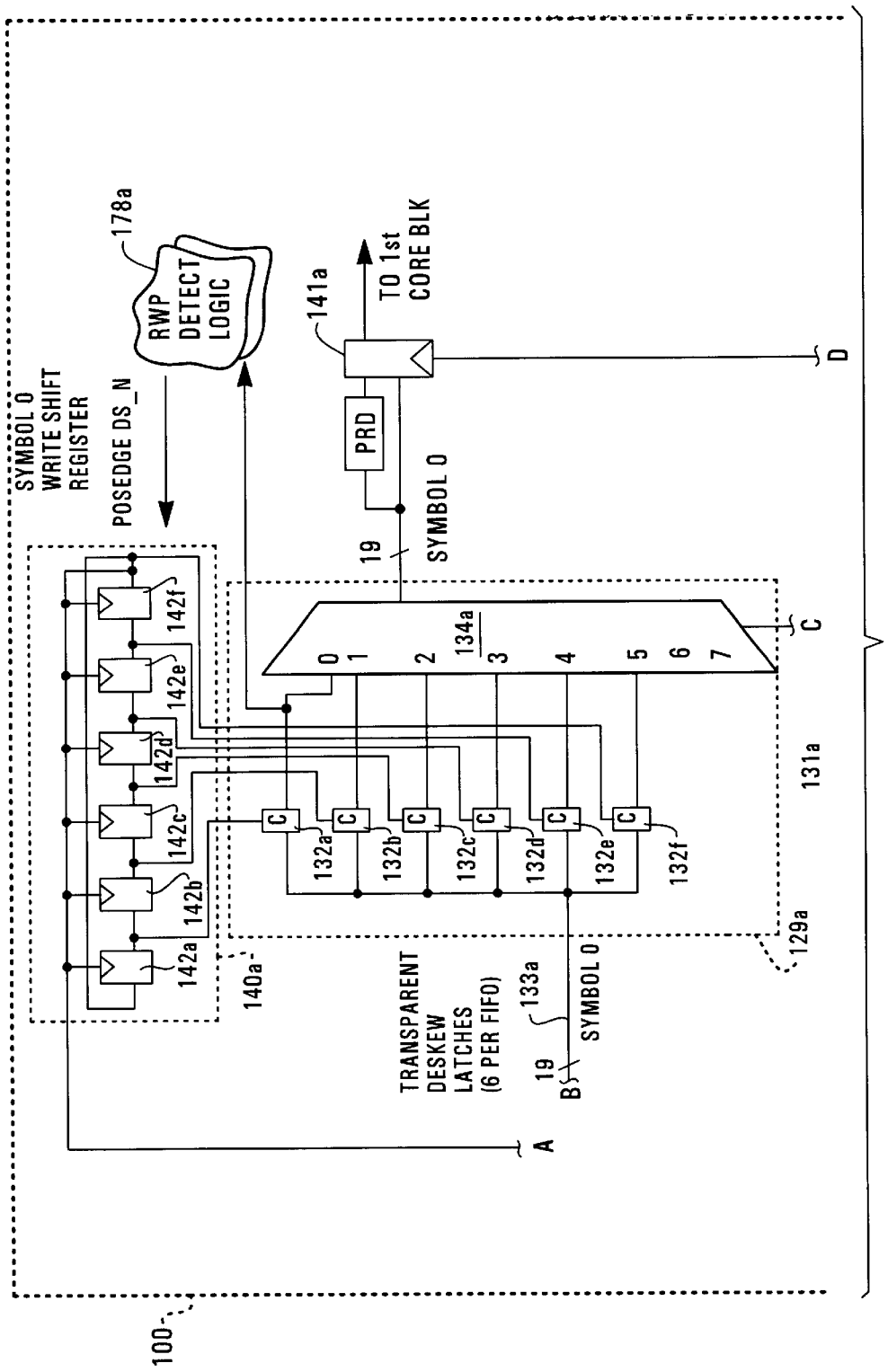
Figure 1C:
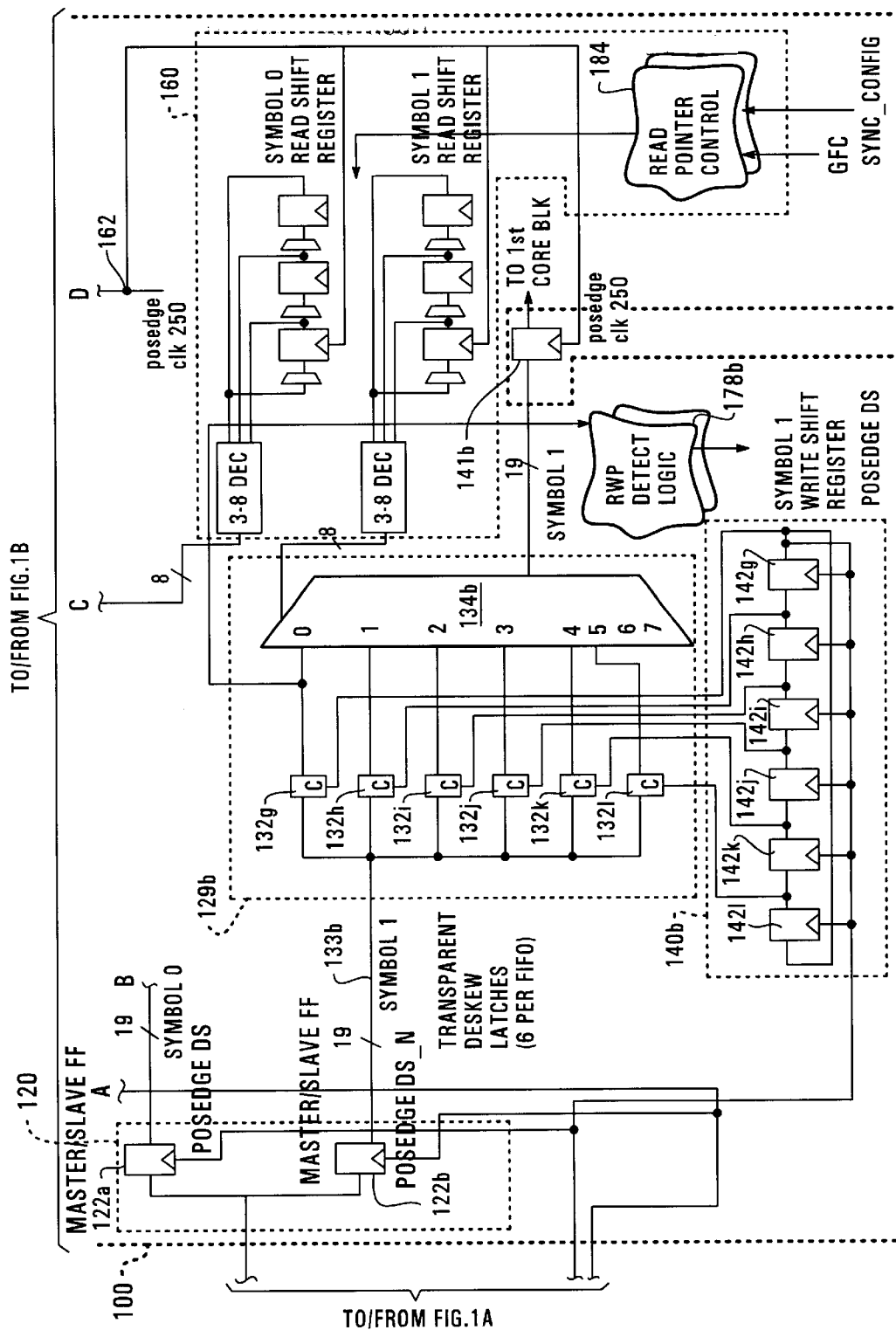

FIG. 1 shows a partial block diagram of a synchronizer and the synchronizer initialization circuitry of the present invention for initializing a synchronizer for the same frequency across multiple bit-sliced interfaces when the phase is unknown. Further information on the synchronizer circuit can be found in the patent application "Simple, High Performance, Bitsliced Mesochronous Synchronizer for a Source Synchronous Link", having Ser. No. 09/561,143, filed on Apr. 28, 2000, which is hereby incorporated by reference.

Referring to FIG. 1, the synchronizer 100 of the receiving chip 102 is electrically coupled to the sending chip 104 via a link 106 that includes a data bus 108, a data strobe (DS) clock signal 110, and a data strobe not (DS_N) signal 111. The partial block diagram of the sending chip 104 shows the last flip flops 112a, 112b, 112c on the sending chip 104 before the driver circuitry 114a, 114b, 114c. In the embodiment shown in FIG. 1, the data link 108 is 19 bits while the DS and DS_N signals 110, 112 are a single bit.

Referring to FIG. 1, the initialization circuitry of the synchronizer includes a pattern generator 170 for generating an initialization pattern, a pattern detector 178a, 178b for recognizing the initialization pattern, and a read select circuit 160. The initialization pattern is generated on the sending chip and is detected by a pattern detector located on the receiving chip. The pattern detector is electrically coupled to the output of the pattern generator (latched in the data buffer of the synchronizer) so that it can detect the pattern. The read select circuit is electrically coupled to the data buffer of the synchronizer. The RWP detect logic circuit 178a, 178b is electrically coupled to the write control circuit 140a, 140b. A predetermined number of cycles after receipt of a unique clock cycle identifier signal (the global frame clock) by the read select circuit, valid data in lockstep with other bitsliced interfaces can be read from a data buffer of the synchronizer.

Figure 2:
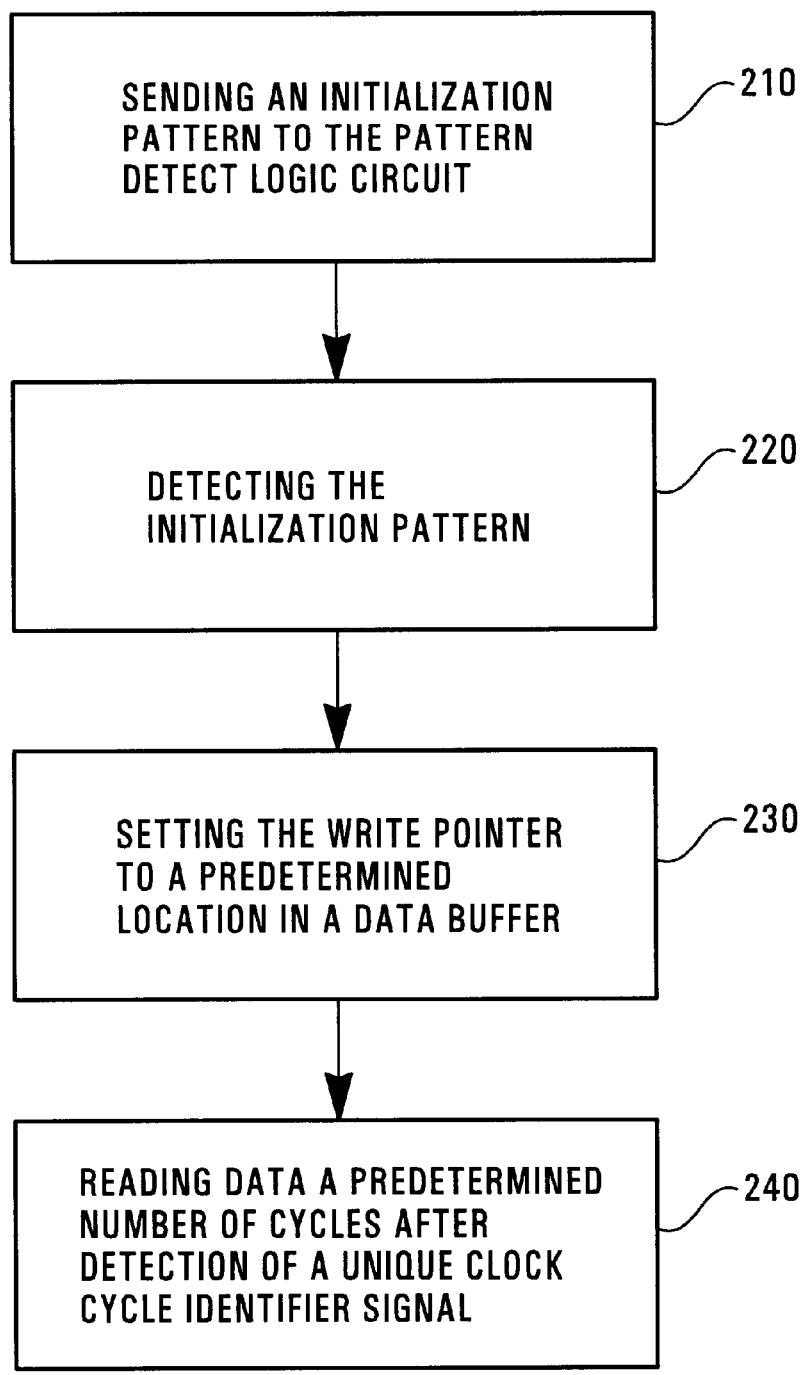
FIG. 2 shows a synchronizer initialization flowchart according to the present invention.

FIG. 2 shows a synchronizer initialization flowchart according to the present invention. Referring to FIG. 2 shows the steps of sending an initialization pattern to the pattern detect logic circuit 210; detecting the initialization pattern 220; responsive to detection of the initialization pattern, setting the write pointer to point to a predetermined location in the data buffer circuit 230; and responsive to detection of a unique clock cycle identifier signal, reading the data from the data buffer a predetermined number of cycles after recognition of the unique clock cycle identifier signal 240.

Figure 3:
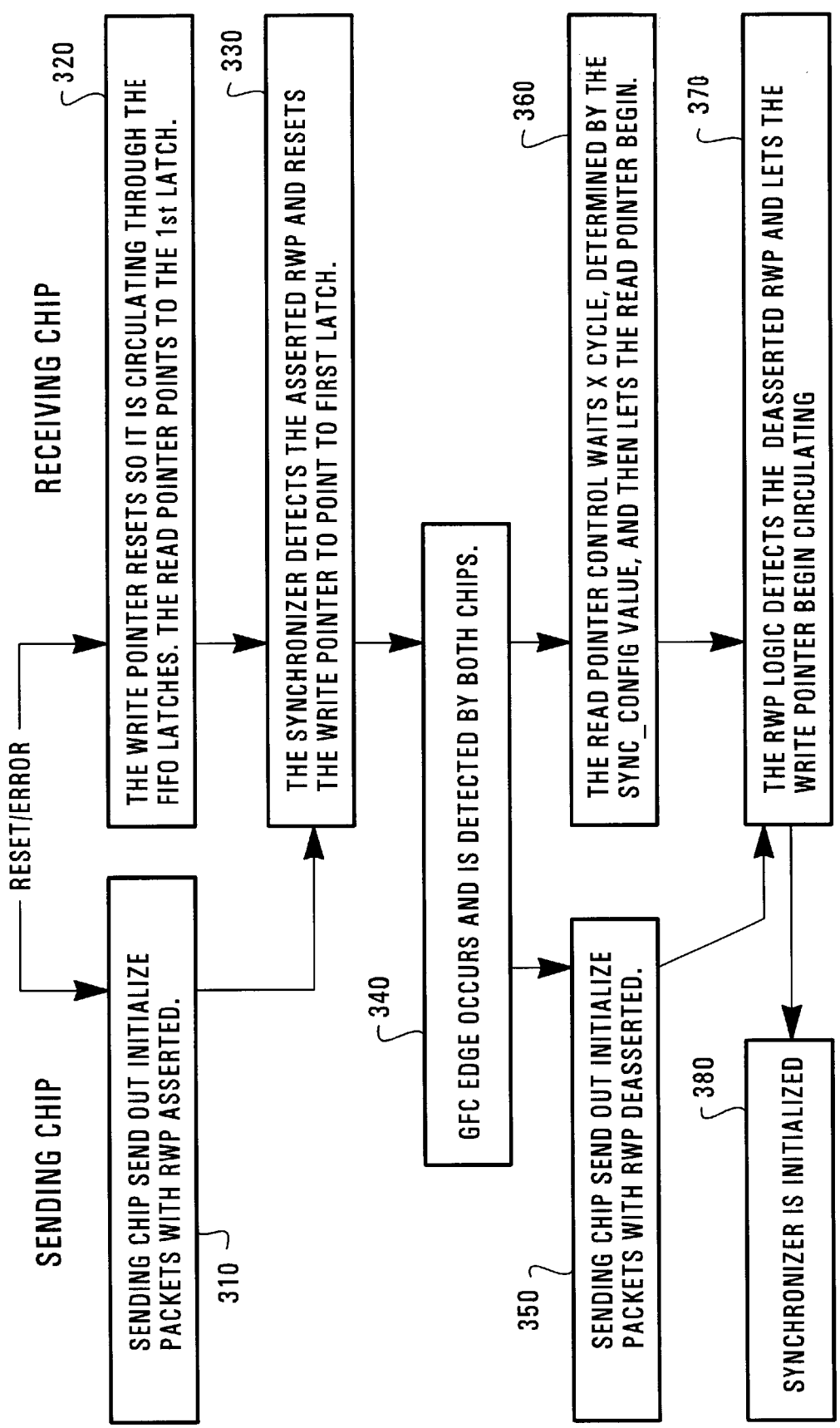
FIG. 3 shows a synchronizer initialization flowchart specifying actions taken by the sending and receiving chips.

FIG. 3 shows a synchronizer initialization flowchart that is more detailed than the flowchart shown in FIG. 2 and that references actions taken by both the sending and receiving chips. FIG. 3 shows two columns of actions. The steps listed on the left hand side, under the column "Sending Chip", refer to actions taken by the sending chip. The steps listed on the right hand side, under the column "Receiving Chip", refer to actions taken by the receiving chip.

The steps recited in FIG. 3 for synchronizer initialization include the steps of: sending the initialization pattern from the sending chip to the receiving chip with RWP asserted (step 310); resetting the write pointer of the synchronizer so that the write pointer points to the data storage circuits of the data buffer circuit in a predetermined pattern (step 320); resetting the read pointer to point to the first data storage circuit of the data buffer circuit (step 320); detecting the asserted RWP initialization pattern (step 330); resetting the write pointer of the synchronizer to point to the first data storage circuit of the data buffer (step 330); detecting the unique clock cycle identifier at both the sending chip and receiving chip (step 340); sending the initialization pattern from the sending chip to the receiving chip with the RWP initialization pattern deasserted (step 350); letting the read pointer circulate through the data storage circuits of the data buffer circuit after a predetermined number of cycles after detection of the unique clock cycle identifier (step 360); and detecting the deasserted RWP initialization pattern (step 370); and letting the write pointer begin circulating through the data storage circuits in the data buffer circuit in a predetermined pattern (step 370). After steps 310–370, the synchronizer is initialized (step 380).

Because the flowchart shown in FIG. 3 is more detailed than the flowchart shown in FIG. 2, it includes steps not found in FIG. 2. The step of sending an initialization pattern to a pattern detector circuit (step 210) corresponds to step 310 of FIG. 3. The step of detecting the initialization pattern (step 220) corresponds to step 330 of the flowchart in FIG. 3. The step of setting the write pointer to a predetermined location in the data buffer circuit (step 230) corresponds to step 330. The step of reading data from a predetermined location in the data buffer circuit a predetermined number of cycles after detection of the unique clock cycle identifier signal (step 240) corresponds to steps 360.

During power-up, link failure, or for other predetermined error conditions, both the sending chip 104 and receiving chip 102 will go into reset-mode. Referring to FIG. 3, during reset-mode, the sending chip 102 sends out special initialize packets (step 310) which contain a special initialization pattern called the RWP (reset write pointer). The initialize packet sent out by the initialization pattern generator contains a number of bits, three of which (in the preferred embodiment) make up the RWP pattern. When the RWP pattern is asserted, all three bits of the RWP pattern are set to 1s. When the RWP pattern is deasserted, all three bits of the RWP are set to zero. The RWP is asserted when any two out of three bits are asserted, (which makes it invulnerable to single bit errors) and is deasserted after the GFC is detected.

Referring to FIG. 1 shows the RWP pattern generator 170. The input to the RWP pattern generator 170 is the GFC signal 172. The output 174 of the RWP pattern generator 170 is electrically coupled to the last flip flops on the sending chip. Thus, the RWP pattern is sent from the sending chip to the data capture circuit 120 of the synchronizer and will eventually be stored in some of the data latches 132*a–f*, 132*g–l* of the interface circuits 129*a*, 129*b*.

When the receiving chip first goes into reset-mode, it needs to reset the write pointer so the pointer is circulating sequentially through the data storage latches 132*a–f*, 132*g–l*, starting from any latch. FIG. 1 shows a synchronizer circuit that includes a plurality of data storage latches 132*a–f*, 132*g–l*, a data selection circuit 134*a*, 134*b* and write control logic 140*a*, 140*b*. The write pointer is implemented with a shift register and is the one hot signal generated by the write control logic 140*a*, 140*b*. In the preferred embodiment, both write control logic circuits 140*a*, 140*b* are initialized with one hot signal (zero) where a single node is zero and all of the other nodes are one. The node that is set to zero, makes the data storage latch clocked by it transparent. During reset, the write control logic data storage latches 142*a–f*, 142*g–l* are reset with a single latch set to the value of zero, while the rest of the latches are set to a value of one.

The data coming off the link 106 will thus be latched into successive latches in the FIFO. The term FIFO refers to the data storage latches 132*a–f*, 132*g–l* connected to the data selection circuit 134*a*, 134*b* along with the write control logic 140*a*, 140*b* which together implement a FIFO. There is logic, the RWP initialization pattern detector 178*a*, 178*b*, electrically coupled to the output 180*a*, 180*b* of the first FIFO latch that inspects the data coming from the first latch 132*a*, 132*g*. When the RWP initialization pattern detector 178*a*, 178*b* detects an initialize packet with an RWP pattern asserted, it resets the write pointer to point to the first latch 132*a*, 132*g*. The write pointer keeps pointing to the first latch until an initialize packet with the RWP deasserted is detected.

Upon entering initialization, the read pointer is set to point to the first latch 132*a*, 132*g* (step 320). For the embodiment shown in FIG. 1, the read pointer is essentially the MUX select signal. The read control logic 160 generates an encoded signal (that is decoded right before the MUX (the data selection circuit 134*a*, 134*b*)) that acts as a FIFO pointer by selecting one of the eight data selection inputs to go to the MUX output.

When the logic 178*a*, 178*b* detects an initialize packet with an RWP pattern asserted (step 330), it resets the write pointer to point to the first latch 132*a*, 132*g*. The write pointer keeps pointing to the first latch until an initialize packet with the RWP deasserted is detected (step 370). At that point the write pointer begins circulating (step 370). Thus, the first initialization packet with RWP deasserted is located in the first latch, and the second such packet is located in the second latch, and so on. In this way, the symbols that need to be in lockstep together in different bitsliced interfaces are all placed into the same latches in their respective FIFOs even if they arrive at different times.

Sometime after the sending and receiving chips enter reset-mode, they should both see the global frame clock (GFC) on a particular chip clock cycle. When they do, the sending chip 104 deasserts the RWP (step 350), and the receiving chip knows that SYNC_CONFIG-1 cycles later, its read pointer needs to be pointing to the first latch of the FIFO and should continue circulating that read pointer through the FIFO latches from there (step 360).

Initializing the synchronizer includes the step of detecting the unique clock cycle identifier at both the sending chip and receiving chip (step 340). In the preferred embodiment, the unique clock cycle identifier is the global frame clock (GFC). The GFC is used by the receiving chip as a unique clock cycle identifier to synchronize data across interfaces so that data can be read in lockstep. The GFC as a synchronizing signal is easy to create and route with low skew to the chip core clock, since it is preferably a low frequency clock signal that has the same skew as the core clock. The GFC marks a unique chip core clock cycle on each chip, thus allowing the synchronizer control logic to pull data from the different receiving chips in the system on the same clock edge.

The global frame clock (GFC) is a low frequency clock with a 50% duty cycle whose distribution matches that of the clocks being distributed to these chips. Since it is a clock signal, it does not occur just once at reset. Its distribution follows that of the clocks, so it should have low skew from the chip clocks. Thus, the GFC should be able to accurately mark the same, periodic cycles of the chip clocks on all the different chips.

Figure 4:
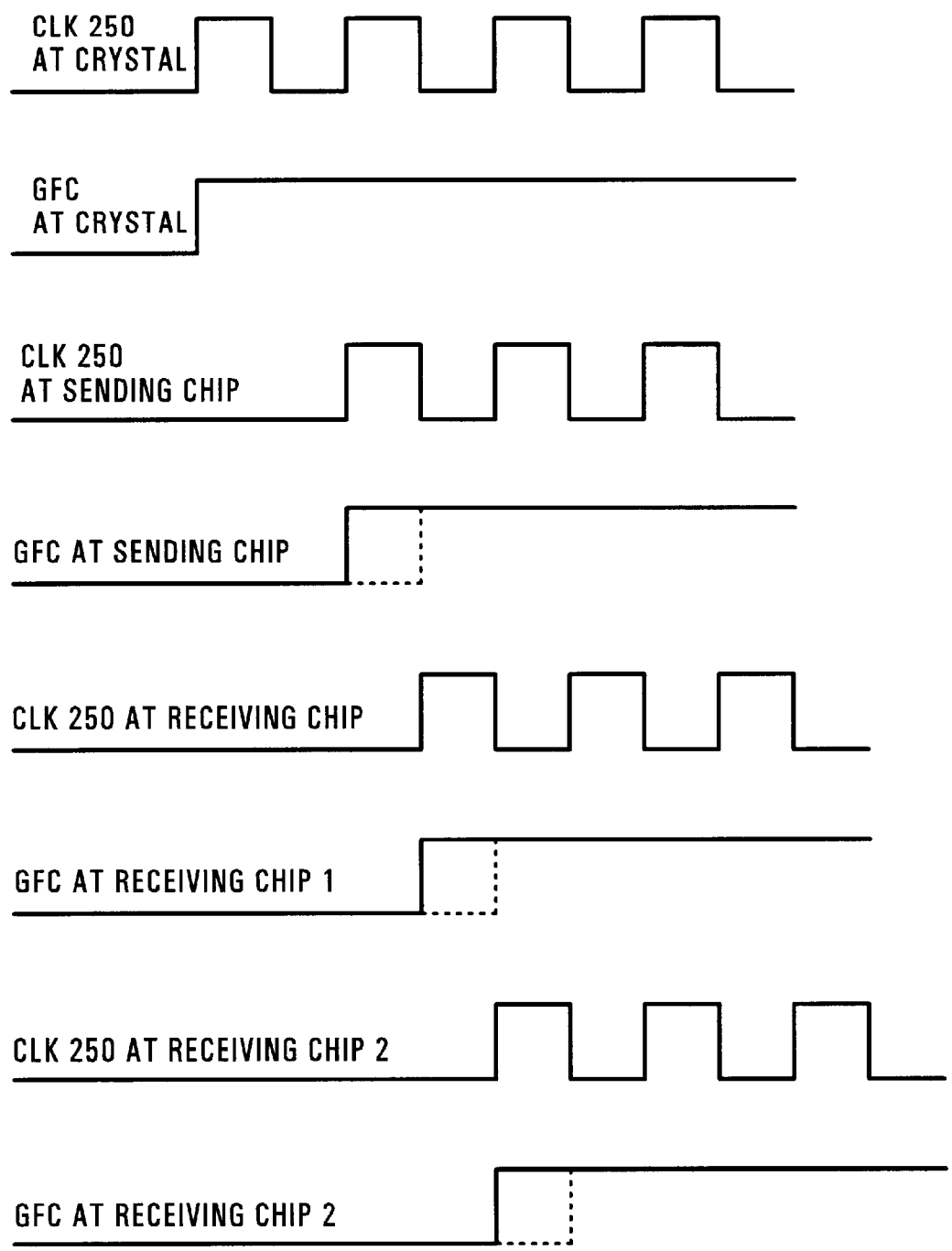
FIG. 4 shows a timing diagram of core clock signal of sending chip compared to the GFC clock and core clock signals at two receiving chips.

FIG. 4 shows a timing diagram of a core clock signal of a sending chip compared to the GFC clock and core clock signals at two receiving chips. In the preferred embodiment, the GFC clock is generated from same crystal as CLK250. The first timing signal is representative of the clock (250 MHz) at the crystal generating the core clock signal. The second timing signal is representative of the GFC at the crystal. The third and fourth timing diagrams are representative of the clock 250 signal and the corresponding GFC at the sending chip. The fifth and sixth timing diagrams are representative of the clock 250 signal and the corresponding GFC at receiving chip 1. The seventh and eighth timing diagrams are representative of the clock 250 signal and the corresponding GFC at receiving chip 2.

Although the GFC is a clock signal and it goes through same clock buffers as the core clock in order to create same skew, the on-chip circuitry registers the GFC as data. Thus, although the edge of the GFC signal in FIG. 4 is shown as being coincident with the core clock edge, in reality on the PC board the GFC must be delayed so that it arrives in the middle of the chip cycle. (The dotted line next to the GFC signal shows a representation of the delayed signal.) The same circuitry and number of register stages should be used by each chip with this synchronizer. Thus, all chips on the link should detect a GFC edge transition in the same cycle.

The GFC is distributed to all of the receiving chips on the link so that none of the chips need to communicate directly. This allows synchronization of bitsliced data to be much faster than if communication between the chips had to take place. Because the GFC signal can be easily routed to multiple chips, the synchronizer design and initialization process and apparatus can easily be used with any number of bitsliced interfaces. For example, the synchronizer implementation and initialization could work with one sending chip and two receiving chips or alternatively with two sending chips and one receiving chip. The GFC acts as a reference point, so if data is received and registered by the core clock domain three cycles after the GFC for receiving chip 1, data would be delayed by the synchronizer so that it is also registered three cycles after the GFC for receiving chip 2.

After the GFC edge occurs and is detected by both chips (step 340), the sending chip 104 sends out initialize packets with RWP deasserted (step 350). A predetermined number of cycles after recognition of the unique clock cycle identifier signal, the read pointer begins circulating and data is read from the data latches 132*a–f*, 132*g–l* (the FIFO). The predetermined delay is related to the synchronizer configuration (SYNC_CONFIG) bits.

The synchronizer configuration bits, in the preferred embodiment two bits, are determined prior to synchronizer initialization and are dependent on the worst case latency of the synchronizer. Because the circuit configuration, length of wires, resistance of wires, number of circuit elements, and impedances associated with circuit elements is known, the worst case latency can be calculated. The worst case latency is assumed in order to ensure that valid data is read. The SYNC_CONFIG bits also allow adjustments to be made during lab link debug and characterization. After validation and testing in the lab, the final value for volume shipments can be set.

The SYNC_CONFIG value indicates the number of cycles between the GFC edge when data is sent out from the sending chip to when it should be latched by the core clock in the synchronizer block on the receiving chip. SYNC_CONFIG is a configuration value determined through analysis and set through configuration pins on the ports of the receiving chip. The write pointer and read pointer point to the same data location, the first latch 132*a*, 132*g* in the data buffer circuit, before reading can occur and both pointers begin circulating. When the RWP pattern detect logic 178*a*, 178*b* sees that the RWP has been deasserted, the write pointer begins circulating from the first latch 132*a*, 132*g*. Thus, the data that was sent out on the GFC edge is latched into the first FIFO latch and is read out from that latch at the appropriate edge.

On the receiving chip, when the GFC transition is recognized at the synchronizer, a counter in the read pointer logic 184 counts down from the SYNC_CONFIG value. When the counter hits zero, the read pointer logic 184 begin circulating sequentially through the latches. In this way, the read pointer will be pointing to the first latch at SYNC_CONFIG-1 cycles later. The 1 in the formula is due to the fact that the read pointer controls the mux before the synchronizing local clock edge, so it needs to be asserted one cycle prior to that edge. The relationship between the read pointer and the write pointer can be different for each bitsliced interface, but the data will always be synchronized on the same corresponding edge in lockstep.

Figure 5:
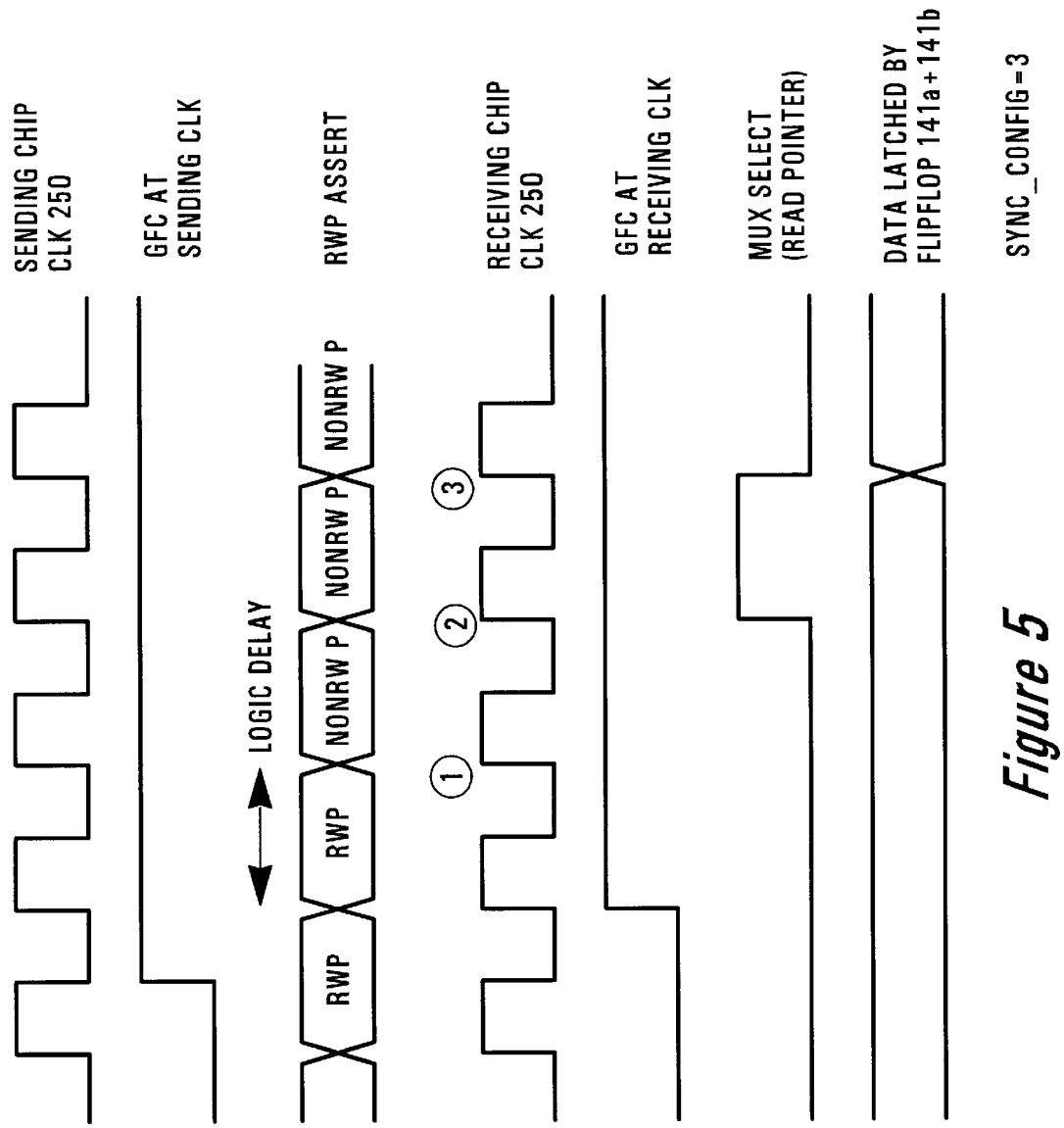
FIG. 5 shows a timing diagram of signals related to initialization on both the sending and receiving chips.

FIG. 5 shows a representative timing diagram of signals related to initialization on both the sending and receiving chips. FIG. 5 shows RWP pattern where RWP is asserted during the first two complete cycles. After recognition of the GFC at the receiving clock, the RWP is deasserted (step 350). The read pointer (MUX select) is enabled and after the SYNC_CONFIG delay begins circulating. Data is read and latched by the receiving chip flip flops 141*a* and 141*b*.

It is understood that the above description is intended to be illustrative and not restrictive. The scope of the invention should be determined with reference to the appended claims, along with the full scope of equivalents to which such claims are entitled.

What is claimed is:

1. A system, comprising:
   sending circuit that generates a series of packets each including a reset write pointer (RWP) indicator, the sensing circuit initially asserting the RWP indicator in each packet in the series and then de-asserting the RWP indicator in each packet in a remainder of the series;
   a set of receiving circuits each having a synchronizer comprising a series of latches for buffering the series of packets, each synchronizer having a circuit that causes each packet having the RWP indicator asserted to be buffered in a first one of the latches in the corresponding series of latches and that causes each packet having the RWP indicator de-asserted to be sequentially buffered in a remainder of the latches in the corresponding series of latches.

2. The system of claim 1, wherein the sending circuit asserts the RWP indicator in each packet initially after a reset.

3. The system of claim 2, wherein the sending circuit de-asserts the RWP indicator in each packet in response to a global frame clock signal.

4. The system of claim 3, wherein each receiving circuit sets a read pointer for the corresponding synchronizer to point to the first one of the latches after the reset.

5. The system of claim 4, wherein each receiving circuit starts circulating the read pointer for the corresponding synchronizer a predetermined number of cycles after receiving the global frame clock signal.

6. The system of claim 5, wherein the predetermined number is independently controllable for each receiving circuit via a set of input pins on each receiving circuit.

7. The system of claim 1, wherein each receiving circuit sets a write pointer for the corresponding synchronizer to point to the first one of the latches when the RWP indicator is asserted.

8. The system of claim 7, wherein each receiving circuit starts circulating the write pointer for the corresponding synchronizer when the RWP indicator is deasserted.

9. A method for initializing a synchronizer in each of a set of receiving circuits, comprising the steps of:

generating a series of packets each including a reset write pointer (RWP) indicator by initially asserting the RWP indicator in each packet in the series and then de-asserting the RWP indicator in each packet in a remainder of the series;

in each synchronizer, buffering each packet having the RWP indicator asserted in a first one of a series of latches in the synchronizer and then buffering each packet having the RWP indicator de-asserted sequentially in a remainder of the series of latches.

10. The method of claim 9, wherein the step of generating the series of packets includes the step of asserting the RWP indicator in each packet initially after a reset.

11. The method of claim 10, wherein the step of generating the series of packets includes the step of de-asserting the RWP indicator in each packet in response to a global frame clock signal.

12. The method of claim 11, further comprising in each synchronizer the step of setting a read pointer to point to the first one of the latches after the reset.

13. The method of claim 12, further comprising in each synchronizer the step of circulating the read pointer a predetermined number of cycles after receiving the global frame clock signal.

14. The method of claim 13, further comprising the step of separately controlling the predetermined number for each synchronizer.

15. The method of claim 9, further comprising in each synchronizer the step of setting a write pointer to point to the first one of the latches when the RWP indicator is asserted.

16. The method of claim 15, further comprising in each synchronizer the step of circulating the write pointer when the RWP indicator is de-asserted.

17. A synchronizer for a bit-slice interface, comprising:
a series of latches for buffering a series of packets received from a sending circuit, each packet including a reset write pointer (RWP) indicator;
circuit that causes each packet having the RWP indicator asserted to be buffered in a first one of the latches in the series of latches and that causes each packet having the RWP indicator de-asserted to be sequentially buffered in a remainder of the latches in the series of latches.

18. The synchronizer of claim 17, wherein the circuit includes a circuit that sets a read pointer to point to the first one of the latches after a reset.

19. The synchronizer of claim 18, wherein the circuit includes a circuit that starts circulating the read pointer a predetermined number of cycles after receiving a global frame clock signal.

20. The synchronizer of claim 17, wherein the circuit includes a circuit that sets a write pointer to point to the first one of the latches when the RWP indicator is asserted and then starts circulating the write pointer when the RWP indicator is de-asserted.

* * * * *